(12) United States Patent
Yagi

(10) Patent No.: US 11,702,168 B2
(45) Date of Patent: Jul. 18, 2023

(54) VEHICLE BODY STRUCTURE OF STRADDLE-TYPE VEHICLE

(71) Applicant: SUZUKI MOTOR CORPORATION, Hamamatsu (JP)

(72) Inventor: Toshiaki Yagi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 121 days.

(21) Appl. No.: 17/499,622

(22) Filed: Oct. 12, 2021

(65) Prior Publication Data

US 2022/0119070 A1     Apr. 21, 2022

(30) Foreign Application Priority Data

Oct. 16, 2020   (JP) .................................. 2020-174564

(51) Int. Cl.
*B62K 11/10* (2006.01)
*B60K 1/04* (2019.01)
*B62J 1/08* (2006.01)
*B62K 19/30* (2006.01)

(52) U.S. Cl.
CPC ................ *B62K 11/10* (2013.01); *B60K 1/04* (2013.01); *B62J 1/08* (2013.01); *B62K 19/30* (2013.01); *B60K 2001/0405* (2013.01)

(58) Field of Classification Search
CPC .... B60K 2001/0416; B60K 2001/0422; B60K 2001/0433; B62K 11/10; B62K 19/36; B62J 1/08
See application file for complete search history.

(56) References Cited

U.S. PATENT DOCUMENTS

| 6,318,743 B1* | 11/2001 | Nakashima | B62K 11/04 180/219 |
| 6,357,542 B1* | 3/2002 | Sako | B62K 19/46 180/68.5 |
| 2005/0017531 A1* | 1/2005 | Nagashii | B62H 5/00 296/37.1 |
| 2005/0082100 A1* | 4/2005 | Sakaki | B62M 7/12 180/219 |

(Continued)

FOREIGN PATENT DOCUMENTS

| JP | 2002-225765 A | 8/2002 |
| JP | 4224977 B2 | 12/2008 |

OTHER PUBLICATIONS

Extended European Search Report dated Mar. 11, 2022, issued by the European Patent Office in corresponding application EP 21202968.0.

*Primary Examiner* — Jeffrey J Restifo
(74) *Attorney, Agent, or Firm* — Stein IP, LLC

(57) ABSTRACT

There is provided a vehicle body structure of a straddle-type vehicle in which an accommodation space of a battery is formed inside a pair of left and right seat rails supporting a seat. The vehicle body structure includes: a seat rail bridge connecting the pair of left and right seat rails; a pair of left and right frame covers covering the pair of left and right seat rails from sides; a battery cover covering the battery arranged in the accommodation space from above; and a frame cover bracket to which the pair of left and right frame covers are attached. The battery cover and the frame cover bracket are attached to the seat rail bridge.

8 Claims, 9 Drawing Sheets

(56) References Cited

U.S. PATENT DOCUMENTS

| | | | |
|---|---|---|---|
| 2005/0156000 A1* | 7/2005 | Kamemizu | B62J 35/00 224/413 |
| 2008/0211250 A1* | 9/2008 | Yano | B62K 19/46 296/37.1 |
| 2010/0078246 A1* | 4/2010 | Sasage | B60L 3/0046 180/220 |
| 2012/0103710 A1* | 5/2012 | Atsuchi | B62J 43/16 180/65.31 |
| 2012/0133117 A1* | 5/2012 | Nagura | B62K 11/10 280/781 |
| 2012/0181783 A1* | 7/2012 | Nakano | B62K 11/10 180/219 |
| 2013/0228389 A1* | 9/2013 | Nakashima | B62K 11/00 180/220 |
| 2014/0060945 A1* | 3/2014 | Atsuchi | B60R 16/04 180/68.5 |
| 2014/0061268 A1* | 3/2014 | Ibaraki | B62J 9/22 224/413 |
| 2015/0042122 A1* | 2/2015 | Imai | B62J 1/06 296/65.01 |
| 2016/0280306 A1* | 9/2016 | Miyashiro | B60L 50/64 |
| 2016/0288860 A1* | 10/2016 | Tani | B62K 19/30 |
| 2019/0152552 A1* | 5/2019 | Yamamoto | B62K 25/283 |
| 2019/0152556 A1* | 5/2019 | Yamamoto | B62J 1/08 |
| 2019/0232806 A1* | 8/2019 | Chen | B62K 11/10 |
| 2020/0239097 A1* | 7/2020 | Ichikawa | B60L 50/60 |
| 2020/0269942 A1* | 8/2020 | Kondo | B62J 1/08 |
| 2020/0274119 A1* | 8/2020 | Okubo | B60K 1/04 |
| 2020/0277016 A1* | 9/2020 | Kobayashi | B62J 43/16 |
| 2020/0283085 A1* | 9/2020 | Okubo | H01M 50/271 |
| 2020/0339207 A1* | 10/2020 | Kobayashi | B62J 43/28 |
| 2021/0066678 A1* | 3/2021 | Okubo | B62J 43/16 |
| 2021/0147025 A1* | 5/2021 | Hatano | B62K 11/04 |
| 2021/0301772 A1* | 9/2021 | Yagi | F02M 35/162 |
| 2022/0033024 A1* | 2/2022 | Okabe | B60K 1/00 |
| 2022/0081055 A1* | 3/2022 | Okabe | H01M 50/249 |
| 2022/0119060 A1* | 4/2022 | Hatano | B32B 1/00 |
| 2022/0119070 A1* | 4/2022 | Yagi | B62K 19/30 |
| 2023/0108243 A1* | 4/2023 | Mori | B62K 11/02 280/152.1 |
| 2023/0109484 A1* | 4/2023 | Ueno | H01M 50/271 180/68.1 |

* cited by examiner

VEHICLE BODY STRUCTURE OF STRADDLE-TYPE VEHICLE

CROSS-REFERENCE TO RELATED APPLICATIONS

This application is based on Japanese Patent Application No. 2020-174564 filed on Oct. 16, 2020, the contents of which are incorporated herein by way of reference.

TECHNICAL FIELD

The present invention relates to a vehicle body structure of a straddle-type vehicle.

BACKGROUND

A seat of a straddle-type vehicle is supported by a pair of left and right seat rails, and various electrical components are accommodated inside the pair of seat rails. A box-shaped battery holder is supported by the pair of seat rails, and a battery is held as an electrical component in the battery holder. An upper surface of the battery holder is open, and the battery is exposed from an opening of the battery holder. As a vehicle body structure of this type of straddle-type vehicle, there has been known a vehicle body structure for protecting the battery from a foreign matter, an impact, or the like by covering the opening of the battery holder with a battery cover (see, for example, Patent Literature 1).

Patent Literature 1: Japanese Patent No. 4224977

Since various articles such as a manual are accommodated inside the pair of seat rails as well as electrical components such as the battery, it is necessary to ensure a large accommodation space inside the pair of seat rails. However, when the battery cover is attached to an inner side of the pair of seat rails, it is necessary to ensure a gap with other members in order to attach and detach the battery cover, and the accommodation space inside the pair of seat rails becomes narrow.

The present invention has been made in view of the foregoing, and an object of the present invention is to provide a vehicle body structure of a straddle-type vehicle that can effectively utilize an accommodation space inside a pair of seat rails even when a battery cover is provided.

SUMMARY

A vehicle body structure of a straddle-type vehicle according to an aspect of the present invention is a vehicle body structure of a straddle-type vehicle in which an accommodation space of a battery is formed inside a pair of left and right seat rails supporting a seat. The vehicle body structure includes a seat rail bridge connecting the pair of left and right seat rails, a pair of left and right frame covers covering the pair of left and right seat rails from sides, a battery cover covering the battery arranged in the accommodation space from above, and a frame cover bracket to which the pair of left and right frame covers are attached, and the battery cover and the frame cover bracket are attached to the seat rail bridge. Accordingly, the problems described above are solved.

DESCRIPTION OF EMBODIMENTS

In a vehicle body structure of a straddle-type vehicle according to an aspect of the present invention, an accommodation space of a battery is formed inside a pair of left and right seat rails supporting a seat. The pair of left and right seat rails are connected to each other by a seat rail bridge, and the pair of left and right seat rails are covered from sides by a pair of left and right frame covers. The battery is accommodated in the accommodation space, and the battery is covered with the battery cover from above. The pair of left and right frame covers are attached to a frame cover bracket. The battery cover and the frame cover bracket are attached to the seat rail bridge, and attachment positions of the battery cover and the frame cover bracket are collectively positioned on the seat rail bridge. Since the attachment portion of the battery cover and the attachment portion of the frame cover bracket are not dispersed, even when the battery cover is attached to the seat rail bridge in order to protect the battery, a large accommodation space is ensured inside the pair of left and right seat rails. Therefore, the accommodation space can be effectively utilized to improve the layout of electrical components and articles other than the battery.

Embodiment

Figure 1:
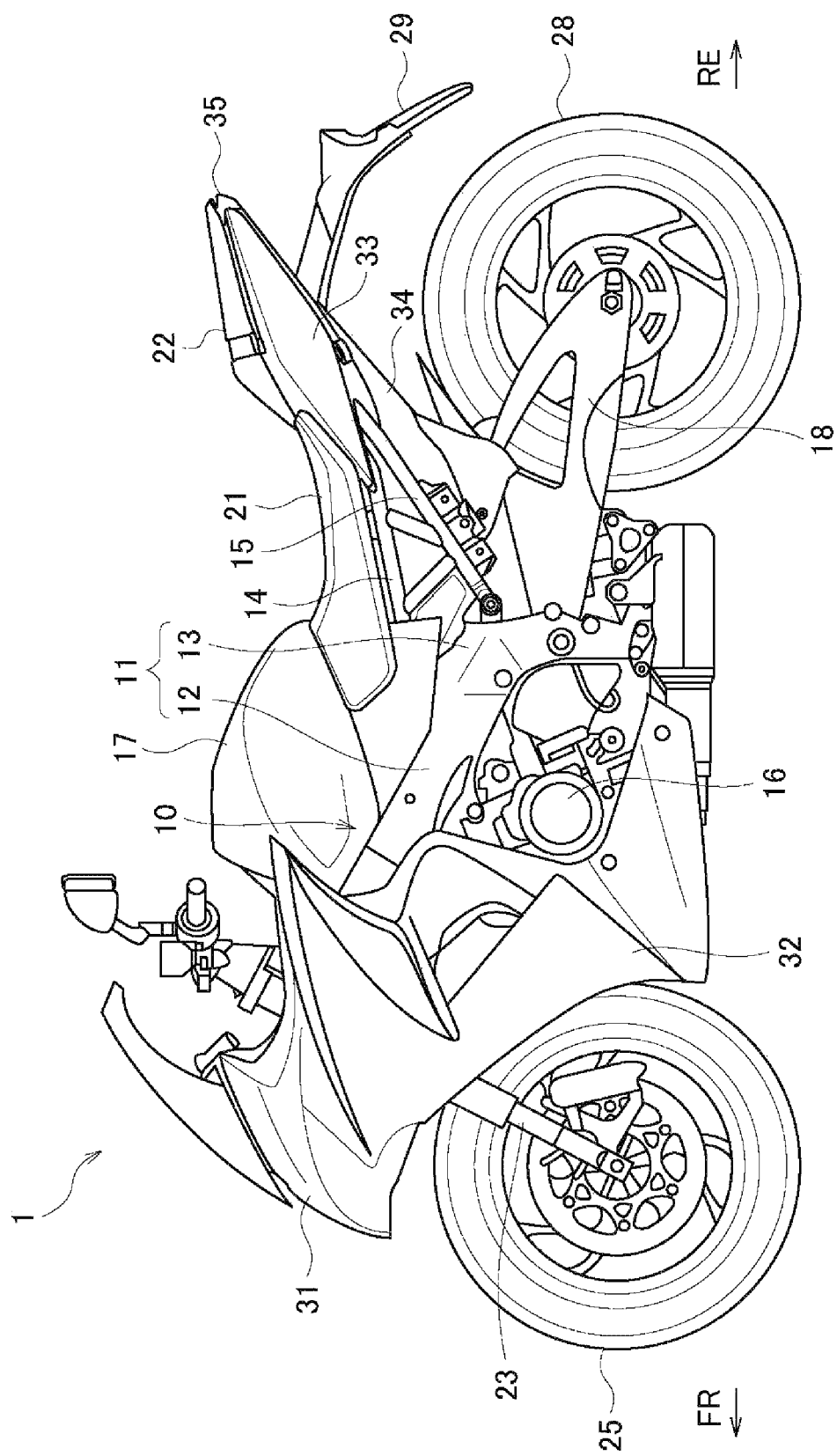
FIG. 1 is a left side view of a straddle-type vehicle according to a present embodiment.

Hereinafter, a straddle-type vehicle to which a vehicle body structure according to an embodiment is applied will be described in detail with reference to the accompanying drawings. FIG. 1 is a left side view of the straddle-type vehicle according to the present embodiment. In addition, in the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is configured by mounting various components such as an engine 16 and an electrical system on a twin spar type vehicle body frame 10 formed by aluminum casting. The vehicle body frame 10 includes a pair of main frames 11 branching from a head pipe (not shown) to the left and right and extending rearward, and a pair of down frames (not shown) branching from the head pipe to the left and right and extending downward. A rear portion of the engine 16 is supported by the pair of main frames 11, and a front portion of the engine 16 is supported by the pair of down frames. Since the engine 16 is supported by the vehicle body frame 10, rigidity of the entire vehicle is ensured.

Front side portions of the pair of main frames 11 are tank rails 12 positioned above the engine 16, and a fuel tank 17 is supported by the tank rails 12. Rear side portions of the pair of the main frame 11 are body frames 13 positioned behind the engine 16, and swing arms 18 are swingably supported at substantially intermediate positions of the body frames 13 in an upper-lower direction. A pair of left and right seat rails 14, 15 extend rearward from an upper portion of the body frame 13. A driver's front seat 21 and a passenger's rear seat 22 are supported by the upper seat rails 14.

A pair of front forks 23 are steerably supported on the head pipe via a steering shaft (not shown). A front wheel 25 is rotatably supported at lower portions of the front forks 23. The swing arms 18 extend rearward from the body frames 13. A rear wheel 28 is rotatably supported at rear ends of the swing arms 18, and an upper side of the rear wheel 28 is covered with a rear fender 29. The engine 16 is connected to the rear wheel 28 via a chain drive type transmission mechanism, and power from the engine 16 is transmitted to the rear wheel 28 via the transmission mechanism.

A front side of the vehicle body frame 10 is covered with a front cowl 31, and a rear side of the front cowl 31 and a front side of the engine 16 are covered with a pair of side covers 32. Sides of the pair of seat rails 14, 15 and a lower side of the rear seat 22 are covered by a pair of frame covers 33, and lower sides of the pair of seat rails 14, 15 are covered with a lower cover 34. Rear end portions of the pair of seat rails 14, 15 are covered by a rear cover 35, and a rear fender 29 is attached to a lower side of the rear cover 35. A grab bar (not shown) for a passenger straddling the rear seat 22 to grip is supported by the upper seat rail 14.

In such a straddle-type vehicle 1, it is desired to arrange a battery 68 (see FIG. 6), which is a heavy object, below the front seat 21 in the vicinity of a center of the vehicle. An accommodation space for the battery 68 is formed inside the pair of seat rails 14. In addition to the battery 68, articles such as various electrical components and manuals are accommodated in the accommodation space, so that it is necessary to ensure a large accommodation space. When a battery cover 61 (see FIG. 5) is provided in the accommodation space for battery protection, it is difficult to ensure a large accommodation space since a gap between the battery cover 61 and other members is required due to attachment and detachment of the battery cover 61.

Therefore, in a vehicle body structure of the straddle-type vehicle 1 according to the present embodiment, attachment portions of various members are collectively positioned, in addition to an attachment portion of the battery cover 61, on a seat rail bridge 43 (see FIG. 5) connecting the pair of seat rails 14. Since the attachment portion is not required for each member, the straddle-type vehicle 1 has a simple vehicle body structure, and a large accommodation space for an electrical component, an article, or the like is ensured inside the pair of seat rails 14. At this time, since the height of an accommodated article arranged below the front seat 21 is suppressed and the accommodated article does not interfere with the front seat 21, a flat seat surface is ensured widely on the front seat 21 in a front-rear direction.

Figure 2:
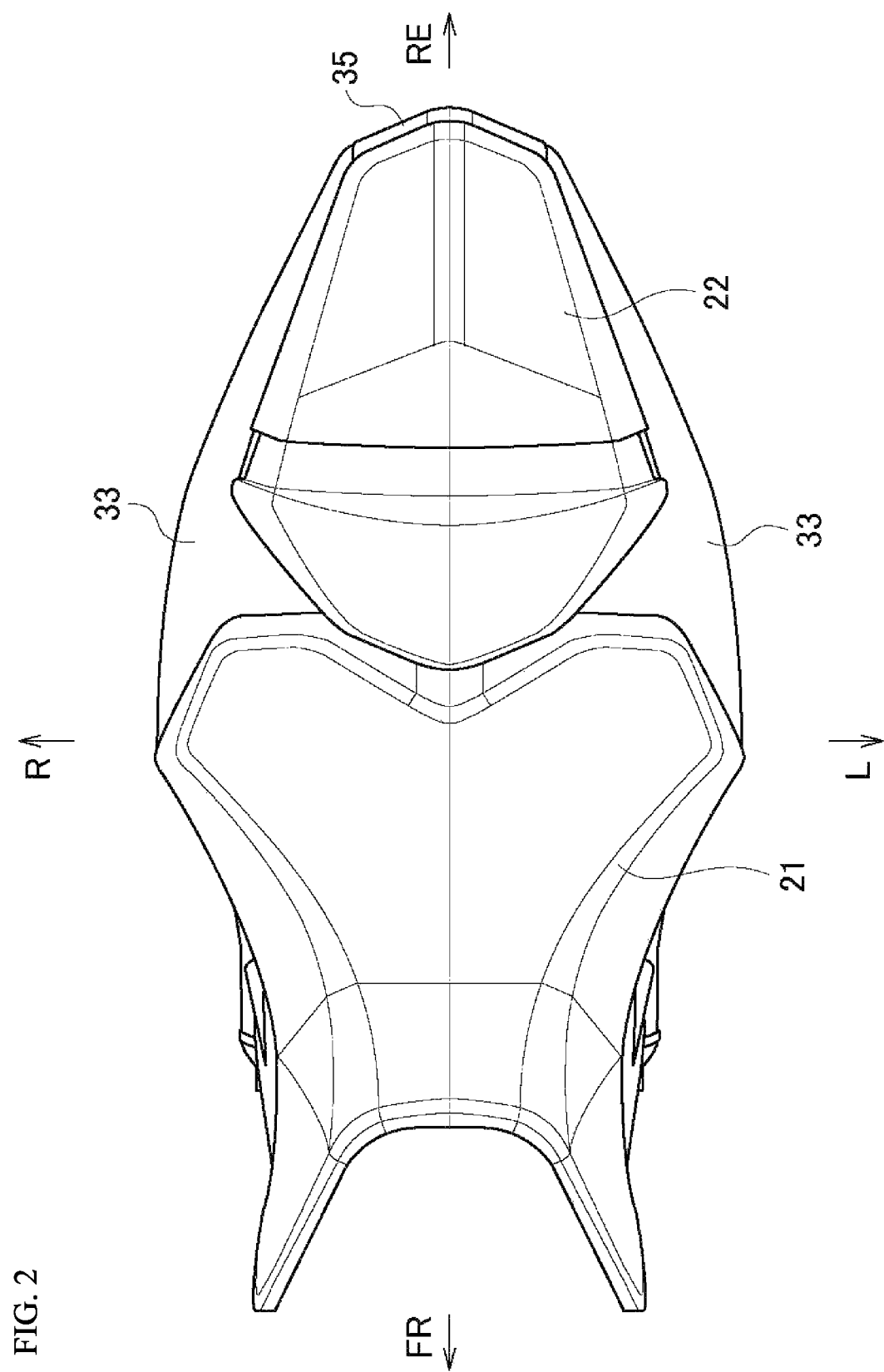
FIG. 2 is a top view of a vehicle rear portion around a seat according to the present embodiment.
Figure 3:
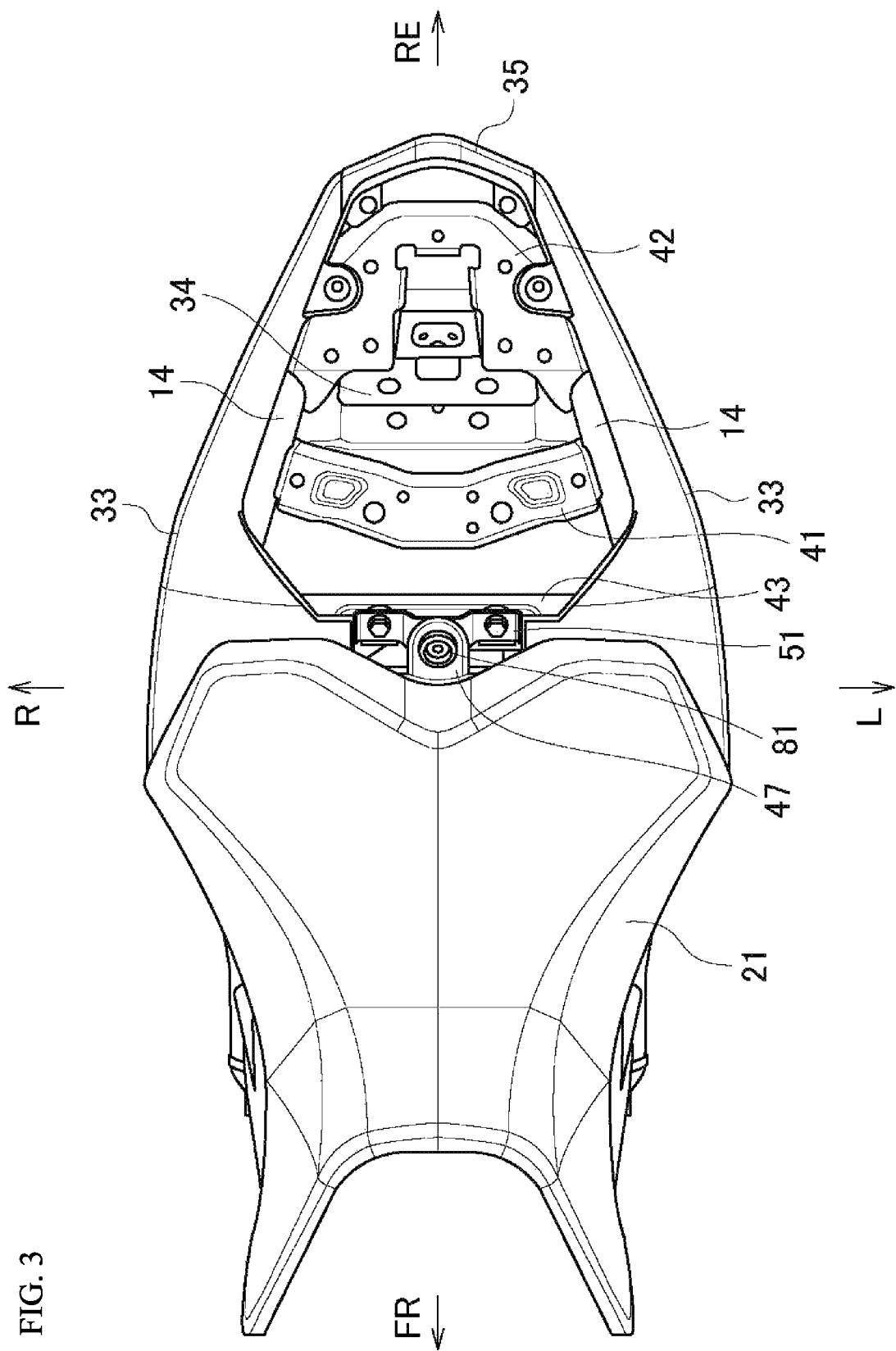
FIG. 3 is a top view of the vehicle rear portion with a rear seat removed from FIG. 2.
Figure 4:
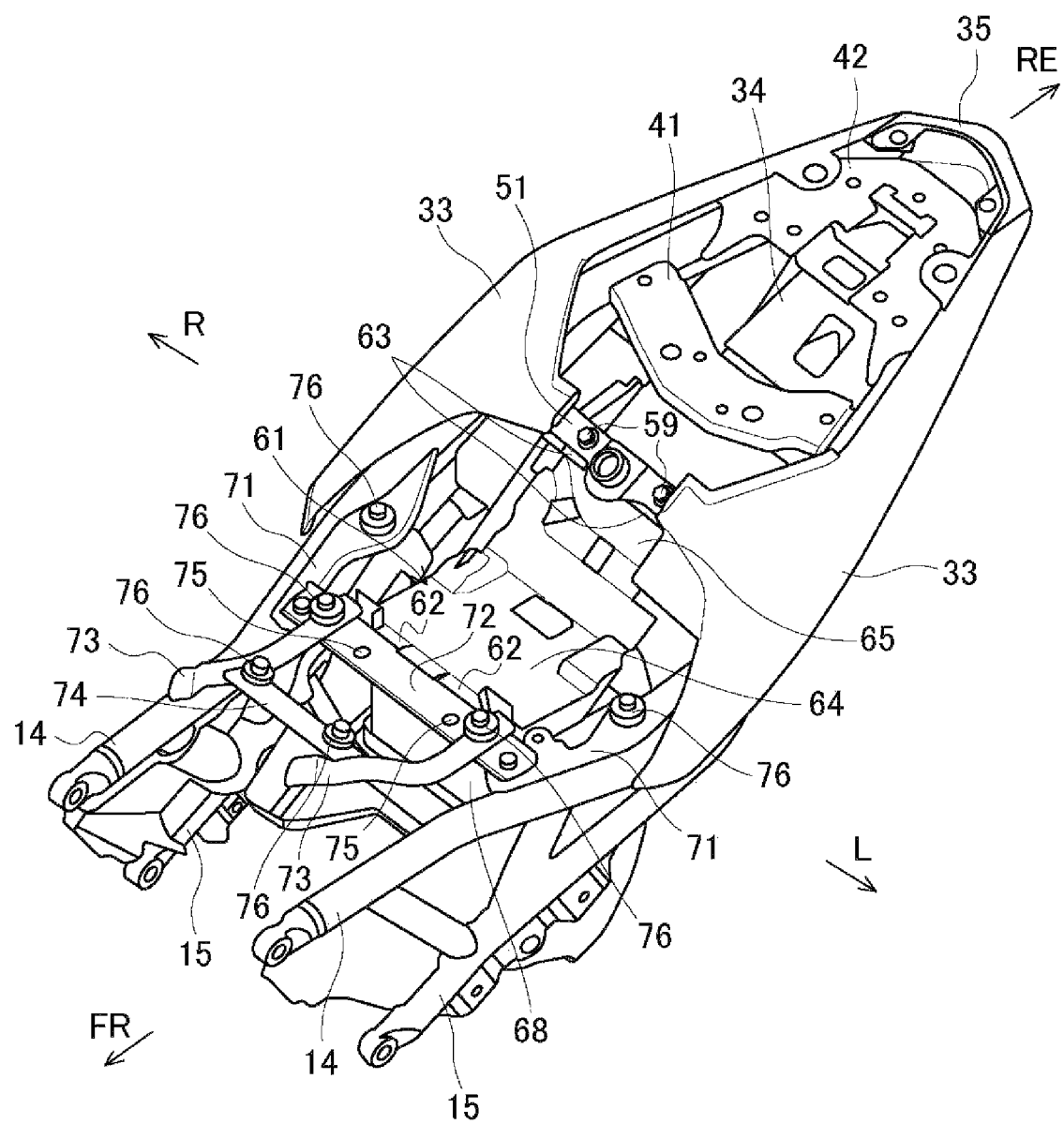
FIG. 4 is a perspective view of the vehicle rear portion with the seat according to the present embodiment removed.
Figure 5:
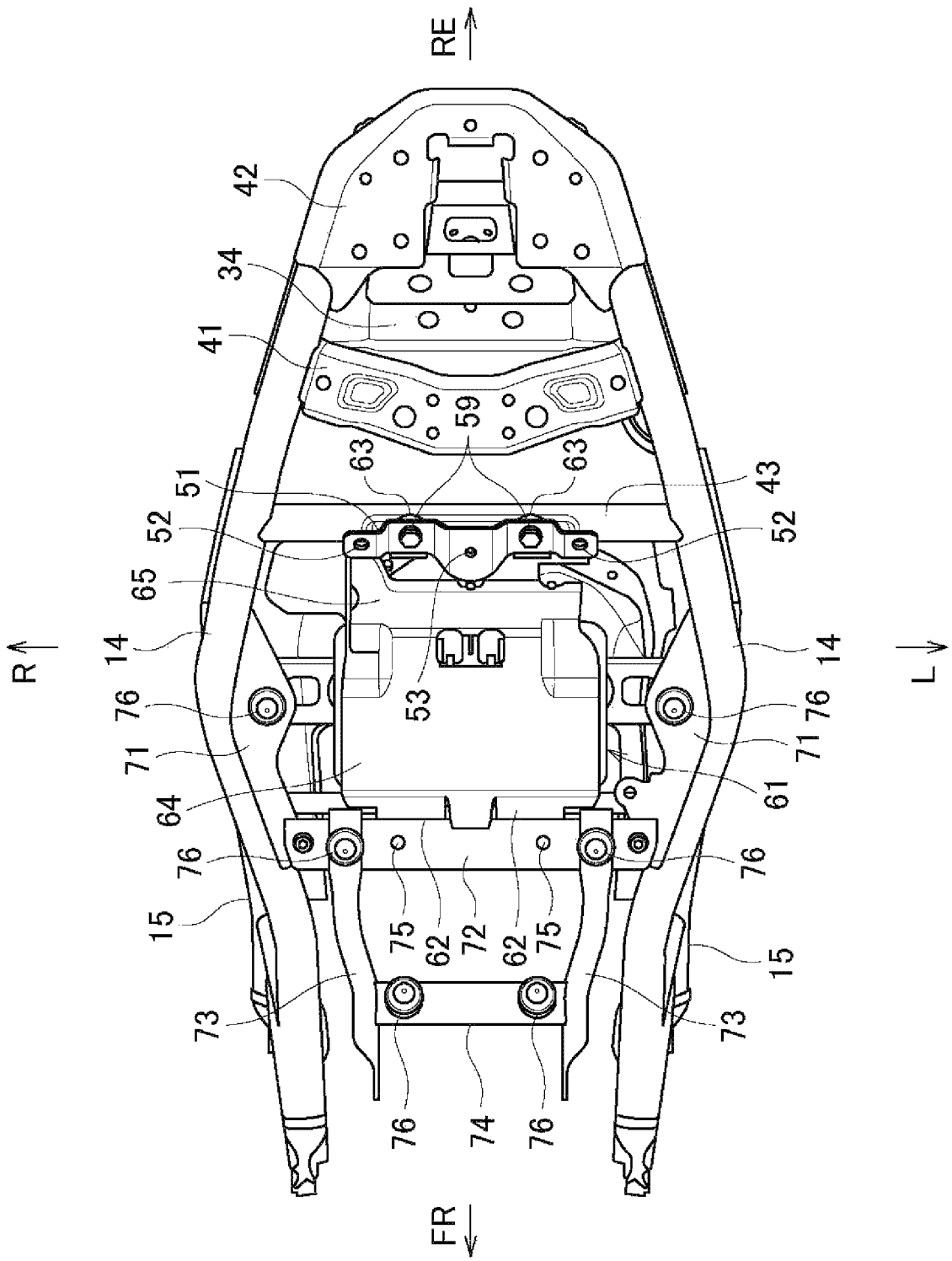
FIG. 5 is a top view of the vehicle rear portion with a front seat and a frame cover removed from FIG. 3.
Figure 6:
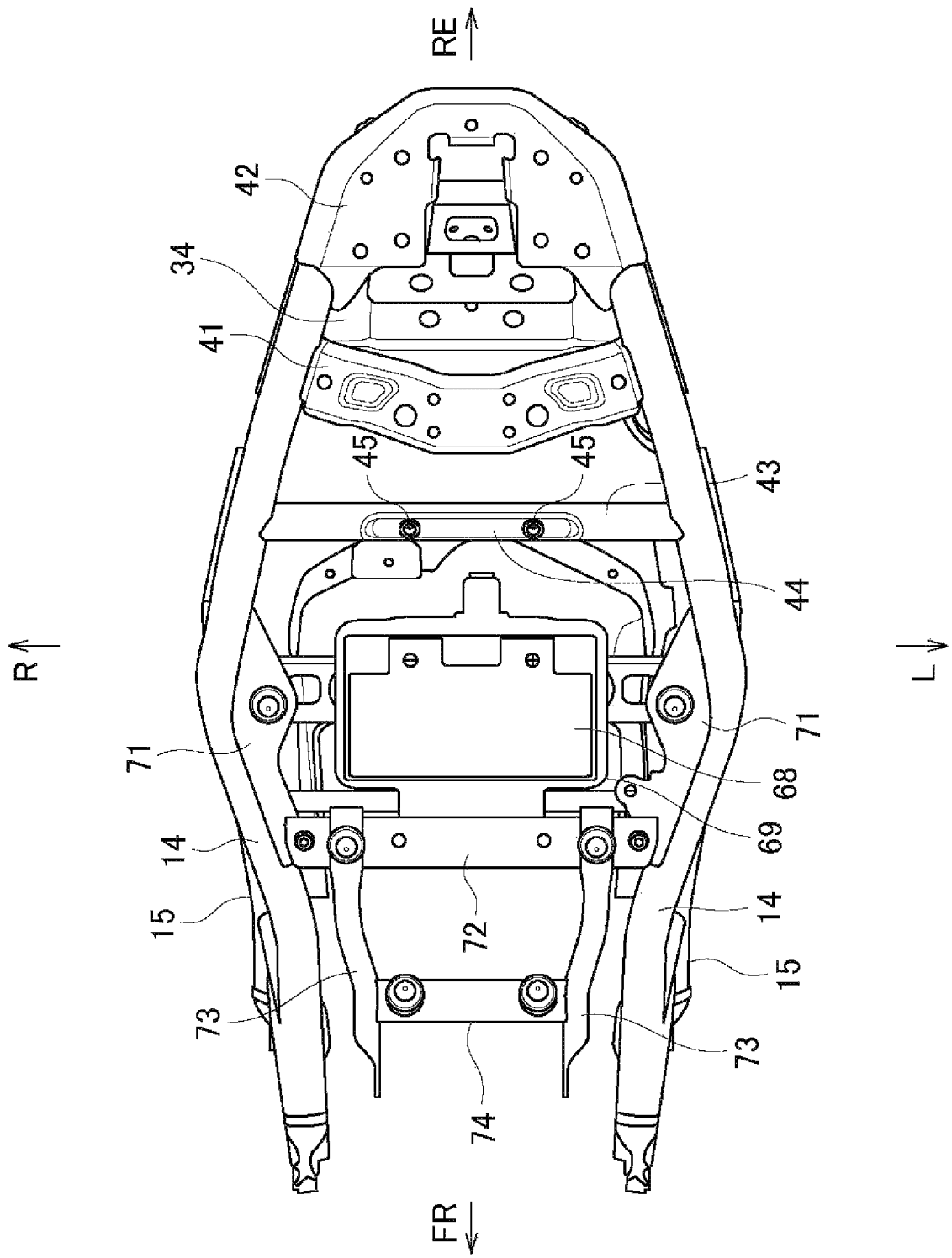
FIG. 6 is a top view of the vehicle rear portion with a battery cover removed from FIG. 5.

Hereinafter, the vehicle body structure of the straddle-type vehicle will be described with reference to FIGS. 2 to 6. FIG. 2 is a top view of a vehicle rear portion around a seat according to the present embodiment. FIG. 3 is a top view of the vehicle rear portion with the rear seat removed from FIG. 2. FIG. 4 is a perspective view of the vehicle rear portion with the seat according to the present embodiment removed. FIG. 5 is a top view of the vehicle rear portion with the front seat and the frame cover removed from FIG. 3. FIG. 6 is a top view of the vehicle rear portion with the battery cover removed from FIG. 5.

As shown in FIG. 2, the front seat 21 and the rear seat 22 are provided side by side in the front-rear direction in the vehicle rear portion of the straddle-type vehicle 1. A rear end portion of the front seat 21 on the front side is recessed forward toward an inner side in a vehicle width direction, and a front end portion of the rear seat 22 on the rear side bulges forward toward the inner side in the vehicle width direction. The bulge at the front end portion of the rear seat 22 enters the recess at the rear end portion of the front seat 21, and the front seat 21 and the rear seat 22 are connected to each other without a gap as viewed from the top of the vehicle. The pair of frame covers 33 are provided on the left and right sides of the rear seat 22, and the rear cover 35 is provided on the rear side of the rear seat 22.

As shown in FIG. 3, when the rear seat 22 (see FIG. 2) is detached from the vehicle rear portion of the straddle-type vehicle 1, the inner sides of the pair of frame covers 33 are exposed upward. Rear half portions of the pair of seat rails 14 are covered from sides by the pair of frame covers 33. Plate-shaped rear seat brackets 41, 42 are attached to the rear half portion of the pair of seat rails 14, and the pair of seat rails 14 are connected by the rear seat brackets 41, 42. A cylindrical seat rail bridge 43 is joined to the pair of seat rails 14 in front of the rear seat bracket 41, and the pair of seat rails 14 are connected by the seat rail bridge 43.

The pair of frame covers 33 are attached to the seat rail bridge 43 via a frame cover bracket 51. A seat plate 47 of the front seat 21 is attached to a center of the frame cover bracket 51 in the vehicle width direction via a tubular cushion 81. The front end portion of the rear seat 22 (see FIG. 2) is supported from below by an upper surface of the cushion 81, and a rear end portion of the rear seat 22 is supported from below by the rear cover 35. In a state in which the rear seat 22 is supported by the cushion 81 and the rear cover 35, the rear seat 22 is fixed to the rear seat brackets 41, 42 by bolts (not shown).

As shown in FIGS. 4 and 5, when the front seat 21 (see FIG. 3) is detached from the vehicle rear portion of the straddle-type vehicle 1, the battery cover 61 that protects the battery 68 inside the pair of seat rails 14, 15 is exposed upward. On the left and right sides of the battery cover 61, rail brackets 71 are joined to the inner side surfaces of the pair of seat rails 14. The pair of rail brackets 71 extend along the seat rail 14. A long plate-shaped front seat bracket 72 is attached to front end portions of the pair of rail brackets 71, and the pair of seat rails 14 are connected to each other by the front seat bracket 72.

A pair of support frames 73 are attached to the front seat bracket 72, and the pair of support frames 73 extend forward from the front seat bracket 72. A long plate-shaped support frame bracket 74 is attached to front end sides of the pair of support frames 73, and the pair of support frames 73 are connected to each other by the support frame bracket 74. A cushion 76 with a protrusion is attached to each of the rail brackets 71, the front seat bracket 72, and the support frame bracket 74, and the seat plate 47 (see FIG. 3) of the front seat 21 is attached to the protrusions of the plurality of cushions 76.

In the front seat bracket 72, a pair of attachment holes 75 for the battery cover 61 are formed inside attachment portions of the pair of support frames 73. A pair of attachment pieces 62 on a front end side of the battery cover 61 are pressed against a lower surface of the front seat bracket 72, and the pair of attachment pieces 62 are fixed to the pair of attachment holes 75 of the front seat bracket 72 by a pair of bolts (not shown). The frame cover bracket 51 is superposed on upper surfaces of a pair of attachment pieces 63 on a rear end side of the battery cover 61, and the pair of attachment pieces 63 are fixed to the seat rail bridge 43 together with the frame cover bracket 51 by a pair of bolts 59.

The battery cover 61 covers the battery 68 arranged inside the pair of seat rails 14, 15 from above. The battery cover 61 includes a horizontal plate portion 64 positioned above the battery 68, and an inclined plate portion 65 extending obliquely upward and rearward from a rear end of the horizontal plate portion 64 to the seat rail bridge 43. Since the battery 68 is covered by the battery cover 61, the battery 68 is protected from a foreign matter or an impact. An upper surface of the horizontal plate portion 64 is also used as a placement surface of other electrical component or an article, and not only the accommodation space below the battery cover 61 but also the accommodation space above the battery cover 61 is effectively utilized.

The frame cover bracket 51 is formed by bending a long plate into a W shape as viewed from the front, and extends along the seat rail bridge 43. Both end portions and a central portion of the frame cover bracket 51 protrude upward, and a pair of bottom portions between both end portions and the central portion of the frame cover bracket 51 are recessed downward. The pair of bottom portions of the frame cover bracket 51 are fixed to the seat rail bridge 43 by the pair of bolts 59 via the pair of attachment pieces 63 of the battery cover 61, and both end portions and the central portion of the frame cover bracket 51 are separated upward from the seat rail bridge 43.

A pair of cover attachment holes (cover attachment portions) 52 to which the pair of frame covers 33 are attached are formed at both end portions of the frame cover bracket 51. A seat attachment hole (seat attachment portion) 53 to which the front seat 21 (see FIG. 2) is attached is formed in the central portion of the frame cover bracket 51. A pair of bridge attachment holes (bridge attachment portions, see FIG. 8) 54, which are attached to the seat rail bridge 43, are formed at a pair of bottom portions of the frame cover bracket 51. Attachment states of the pair of frame covers 33, the front seat 21, the frame cover bracket 51, and the battery cover 61 will be described later.

As described above, the frame cover bracket 51 includes the pair of cover attachment holes 52 positioned on an outer side in the vehicle width direction with respect to the pair of bridge attachment holes 54, and the seat attachment hole 53 positioned between the pair of bridge attachment holes 54. In addition, as viewed from a direction perpendicular to a plate surface of the frame cover bracket 51, the pair of cover attachment holes 52, the pair of bridge attachment holes 54, and the seat attachment hole 53 are aligned on the same straight line. The attachment holes of the battery cover 61, the frame cover bracket 51, the frame covers 33, and the front seat 21 are collectively positioned on the seat rail bridge 43, and tool lines for an attachment work by using tools are also collectively positioned to improve workability.

As shown in FIG. 6, when the battery cover 61 and the frame cover bracket 51 (see FIG. 5) are detached from the vehicle rear portion of the straddle-type vehicle 1, planar portions 44 of the battery 68 and the seat rail bridge 43 are exposed upward. The battery 68 is held by a battery holder 69, and the battery 68 is arranged in the accommodation space via the battery holder 69. In addition to the battery 68, an electrical component such as an electronic control unit (ECU), a fuse box, an electronic toll collection (ETC) unit, or a harness, or an article such as a manual or a tool may be accommodated in the accommodation space.

In the seat rail bridge 43, the planar portion 44 is formed in which a part of an outer peripheral surface is recessed and the battery cover 61 is attached. A pair of self-locking nuts 45 are fixed to the planar portion 44 of the seat rail bridge 43, and head portions of the pair of self-locking nuts 45 protrude from the planar portion 44. The pair of self-locking nuts 45 are attached to positions corresponding to attachment holes 66 (see FIG. 8) of the pair of attachment pieces 63 of the battery cover 61. Recesses 67 (see FIG. 8) for receiving the head portions of the self-locking nuts 45 are formed on lower surfaces of the pair of attachment pieces 63, and the head portions of the self-locking nuts 45 enters the recesses 67, so that the battery cover 61 is positioned on the seat rail bridge 43.

Figure 7:
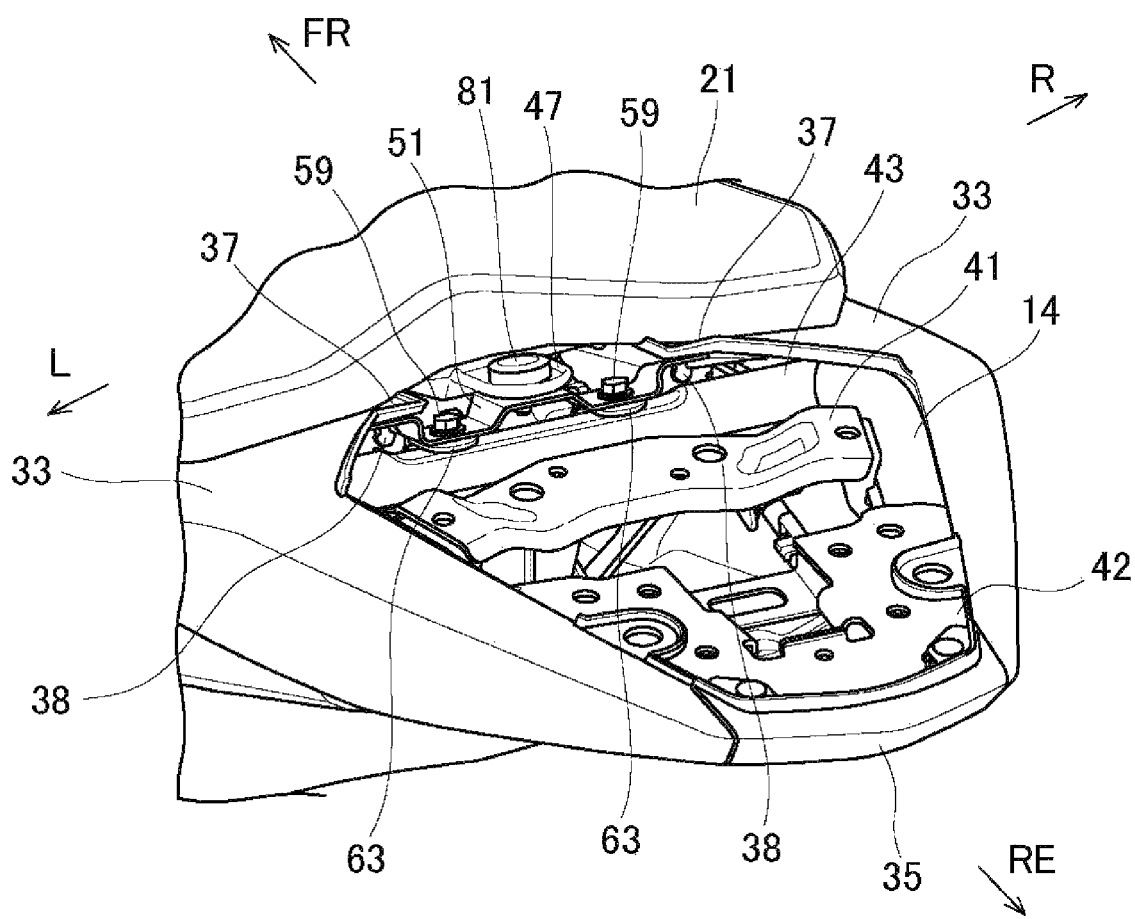
FIG. 7 is a perspective view showing an attachment state of a seat bracket according to the present embodiment.
Figure 8:
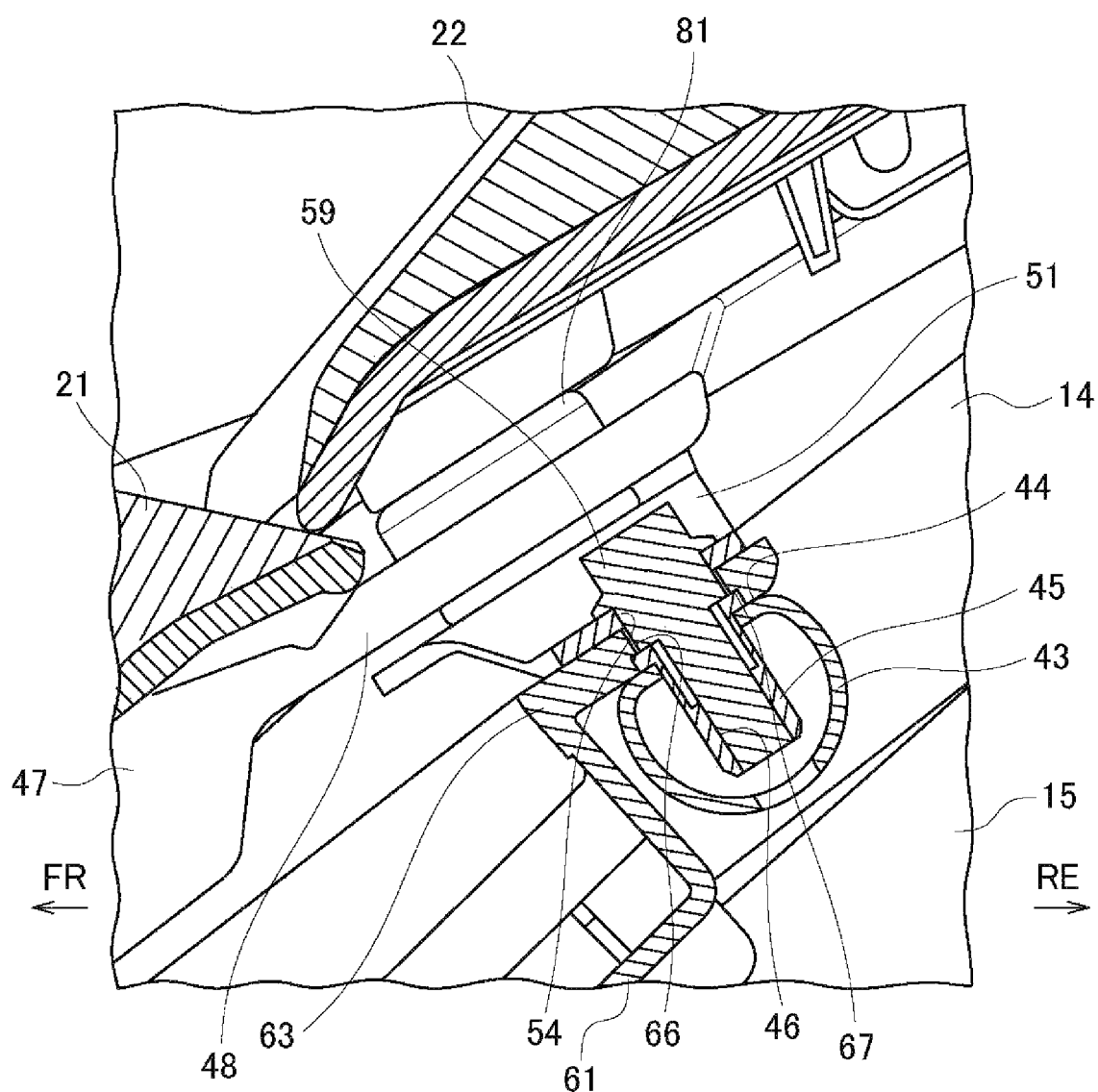
FIG. 8 is a sectional view showing an attachment state of the battery cover according to the present embodiment.
Figure 9:
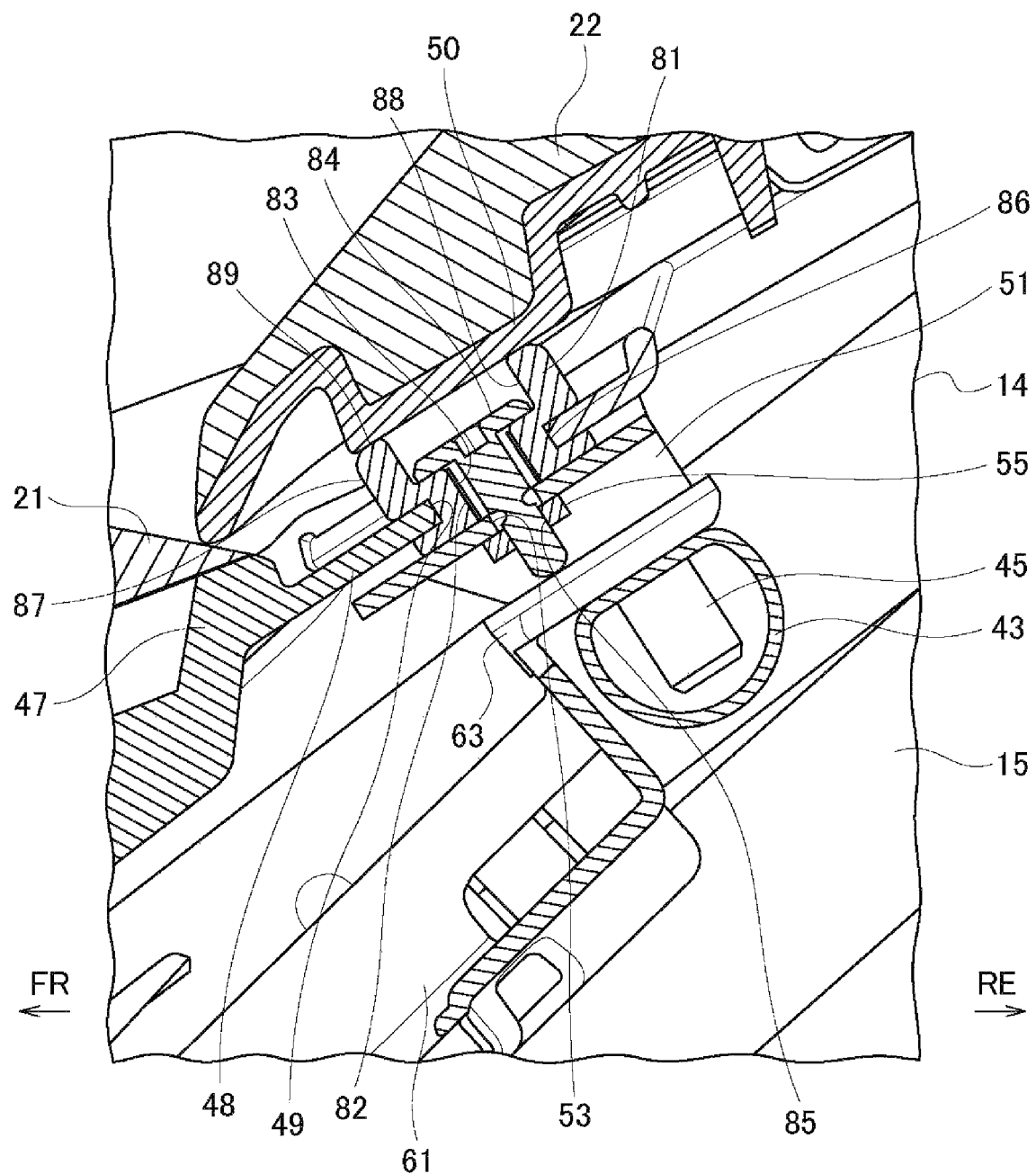
FIG. 9 is a sectional view showing an attachment state of the seat according to the present embodiment.

Attachment states of the seat bracket, the battery cover, and the seat will be described with reference to FIGS. 7 to 9. FIG. 7 is a perspective view showing the attachment state of the seat bracket according to the present embodiment. FIG. 8 is a sectional view showing the attachment state of the battery cover according to the present embodiment. FIG. 9 is a sectional view showing the attachment state of the seat according to the present embodiment.

As shown in FIG. 7, the pair of bottom portions of the frame cover bracket 51 are attached to the seat rail bridge 43 by the pair of bolts 59 together with the pair of attachment pieces 63 of the battery cover 61 (see FIG. 5). Both end portions and the central portion of the frame cover bracket 51 are floated from the seat rail bridge 43, the pair of frame covers 33 are attached to both end portions thereof, and the seat plate 47 of the front seat 21 is attached to the center portion thereof. At this time, both end portions and the central portion of the frame cover bracket 51 have the same height, and the front seat 21 on the seat plate 47 is in contact with the pair of the frame covers 33.

Upper surfaces of the pair of frame covers 33 overhangs toward both end portions of the frame cover bracket 51, and boss portions 38 protrude from lower surfaces of overhang portions 37 of the frame covers 33. Tubular cushions (not shown) are attached to the cover attachment holes 52 (see FIG. 5) of the frame cover bracket 51. The overhang portions 37 of the frame covers 33 are superposed on both end portions of the frame cover bracket 51 from above, and the frame cover 33 is attached to the frame cover bracket 51 by inserting the boss portions 38 into the cushions. A claw is formed at a tip end of the boss portion 38, and the claw is caught on the cushion to prevent the frame cover 33 from coming off. As a result, the attachment portions of the pair of frame covers 33 are collectively positioned on the seat rail bridge 43.

As shown in FIG. 8, the head portions of the pair of self-locking nuts 45 (only one is shown in FIG. 8) protrude from the planar portion 44 of the seat rail bridge 43. The pair of attachment pieces 63 of the battery cover 61 are superposed on the planar portion 44 of the seat rail bridge 43 from above, and the head portions of the pair of self-locking nuts 45 enter the recesses 67 of the pair of attachment pieces 63. The battery cover 61 is positioned with respect to the seat rail bridge 43, and the attachment holes 66 of the pair of attachment pieces 63 are easily aligned with screw holes 46 of the self-locking nuts 45. In addition, the frame cover bracket 51 is superposed on the pair of attachment pieces 63 from above, and the pair of bridge attachment holes 54 are aligned with the attachment holes 66 of the pair of attachment pieces 63.

Tip ends of the pair of bolts 59 are inserted into the screw holes 46 of the pair of self-locking nuts 45 through the pair of bridge attachment holes 54 and the attachment holes 66 of the pair of attachment pieces 63. When the bolt 59 is tightened, the frame cover bracket 51 is pressed against the battery cover 61, and the battery cover 61 is sandwiched between the frame cover bracket 51 and the self-locking nuts 45. The pair of attachment pieces 63 and the frame cover bracket 51 are fastened and fixed to the seat rail bridge 43 by the same bolts 59, and a burden of attaching the battery cover 61 and the frame cover bracket 51 is reduced. As a result, the attachment portions of the frame cover bracket 51 and the battery cover 61 are collectively positioned on the seat rail bridge 43.

At this time, the planar portion 44 of the seat rail bridge 43 is formed by recessing a part of the outer peripheral surface of the seat rail bridge 43, and the upper surfaces of the pair of attachment pieces 63 on the planar portion 44 are adjusted to have the same height as the upper surfaces of the pair of seat rails 14. The battery cover 61 and the frame cover bracket 51 are lowered, the height of the battery 68 below the front seat 21 is suppressed, and it becomes easy to ensure the flat seat surface of the front seat 21. Since the seat rail 14 is inclined so as to be higher toward the rear, the frame cover bracket 51 is lowered, so that the front end of the rear seat 22 is retreated and the flat seat surface of the front seat 21 is widely ensured.

As shown in FIG. 9, a welding nut 55 is joined coaxially with the seat attachment hole 53 on the lower surface of the central portion of the frame cover bracket 51. The cushion 81 is a rubber bush having an H-shaped cross section, and a cylindrical spacer 82 is mounted inside the cushion 81. The cushion 81 is superposed on the seat attachment hole 53, and a through hole 83 of the spacer 82 is aligned with the seat attachment hole 53. Tip end of a bolt 84 is inserted into a screw hole 85 of the welding nut 55 through the through hole 83 of the spacer 82 and the seat attachment hole 53. When the bolt 84 is tightened, the cushion 81 is attached to the frame cover bracket 51.

An annular groove 86 to which the seat plate 47 of the front seat 21 is mounted is formed on an outer peripheral surface (attachment surface) 87 of the cushion 81. A mounting hole 49 is formed in an extending portion 48 at a rear end of the seat plate 47, and an opening edge of the mounting hole 49 enters the annular groove 86 of the cushion 81, so that a rear end side of the front seat 21 is attached to the outer peripheral surface 87 of the cushion 81. A recess 88 for accommodating a head portion of the bolt 84 is formed on the upper surface (support surface) 89 of the cushion 81. When the cushion 81 around the recess 88 abuts against a seat plate 50 of the rear seat 22, a front end side of the rear seat 22 is supported from below by the upper surface 89 of the cushion 81. As a result, the attachment portion of the front seat 21 and a support portion of the rear seat 22 are collectively positioned on the seat rail bridge 43.

As described above, according to the present embodiment, the attachment portions of the pair of frame covers 33, the attachment portion of the frame cover bracket 51, the attachment portion of the battery cover 61, the attachment portion of the front seat 21, and the support portion of the rear seat 22 are collectively positioned on the seat rail bridge 43.

Since the attachment portion and the support portion of the members are not dispersed, even when the battery cover 61 is attached to the seat rail bridge 43 in order to protect the battery, a large accommodation space is ensured inside the pair of seat rails 14. Therefore, the accommodation space can be effectively utilized to improve the layout of electrical components and articles other than the battery 68.

In the present embodiment, the frame cover bracket is superposed on the upper surface of the battery cover, but the battery cover may be superimposed on an upper surface of the frame cover bracket.

In the present embodiment, the battery cover and the frame cover bracket are attached to the seat rail bridge by the pair of bolts, but a method for attaching the battery cover and the frame cover bracket is not particularly limited. The battery cover and the frame cover bracket may be attached to the seat rail bridge by other attachment method such as hooking or clipping.

In the present embodiment, the frame cover is attached to the frame cover bracket by the boss portion of the frame cover, but a method for attaching the frame cover is not particularly limited. The frame cover may be attached to the frame cover bracket by other attachment method such as screwing, hooking, or clipping.

In the present embodiment, the front seat is attached to the frame cover bracket by the cushion attached to the frame cover bracket, but a method for attaching the front seat is not particularly limited. The front seat may be attached to the frame cover bracket by other attachment method such as screwing, hooking, or clipping without interposing a cushion.

In the frame cover bracket according to the present embodiment, the pair of cover attachment holes are positioned on the outer side in the vehicle width direction with respect to the pair of bridge attachment holes, and the seat attachment hole is positioned between the pair of bridge attachment holes, but the positions and the number of the attachment holes are not particularly limited. The frame cover bracket may be provided with a bridge attachment hole, a cover attachment hole, and a seat attachment hole.

Although the bridge attachment hole is illustrated as an example of the bridge attachment portion in the present embodiment, the bridge attachment portion may have any shape as long as the bridge attachment portion can be attached to the seat rail bridge. Although the cover attachment hole is illustrated as an example of the cover attachment portion, the cover attachment portion may have any shape as long as the cover attachment portion can allow the frame cover to be attached. Further, although the seat attachment hole is illustrated as an example of the seat attachment portion, the seat attachment portion may have any shape as long as the seat attachment portion can allow the seat to be attached. The bridge attachment portion, the cover attachment portion, and the seat attachment portion may have, for example, a cutout shape.

In the present embodiment, the front seat and the rear seat are supported as the seats on the pair of seat rails, but at least the front seat may be supported on the pair of seat rails.

In the present embodiment, the battery cover is positioned on the seat rail bridge by the self-locking nut protruding from the outer peripheral surface of the seat rail bridge and the recess formed on the lower surface of the battery cover, but a positioning configuration is not particularly limited. For example, the battery cover may be positioned on the seat rail bridge by a protrusion protruding from the lower surface of the battery cover and a recess formed on the outer peripheral surface of the seat rail bridge.

In the present embodiment, the planar portion is formed by recessing the outer peripheral surface of the seat rail bridge so that the upper surface of the battery cover has the same height as the upper surface of the seat rail, but the planar portion may be formed by recessing the outer peripheral surface of the seat rail bridge so that the upper surface of the battery cover is lower than the upper surface of the seat rail.

In the present embodiment, the battery cover includes the horizontal plate portion and the inclined plate portion, but the shape of the battery cover is not particularly limited as long as the battery cover is formed so as to cover the battery from above.

The vehicle body structure may be adopted not only to the straddle-type vehicle shown in the drawings but also in other types of straddle-type vehicles. The straddle-type vehicle is not limited to general vehicles in which a rider rides in a posture of straddling a seat, and also includes a small-sized scooter-type vehicle in which a rider rides without straddling the seat.

As described above, the vehicle body structure of a straddle-type vehicle according to the present embodiment is a vehicle body structure of a straddle-type vehicle in which an accommodation space of a battery (68) is formed inside a pair of left and right seat rails (14) supporting a seat (front seat 21). The vehicle body structure includes a seat rail bridge (43) connecting the pair of left and right seat rails, a pair of left and right frame covers (33) covering the pair of left and right seat rails from sides, a battery cover (61) covering the battery arranged in the accommodation space from above, and a frame cover bracket (51) to which the pair of left and right frame covers are attached. The battery cover and the frame cover bracket are attached to the seat rail bridge. According to this configuration, the attachment portions of the battery cover and the frame cover bracket are collectively positioned on the seat rail bridge. Since the attachment portion of the battery cover and the attachment portion of the frame cover bracket are not dispersed, even when the battery cover is attached to the seat rail bridge in order to protect the battery, a large accommodation space is ensured inside the pair of left and right seat rails. Therefore, the accommodation space can be effectively utilized to improve the layout of electrical components and articles other than the battery.

In the vehicle body structure of a straddle-type vehicle according to the present embodiment, the battery cover and the frame cover bracket overlap with each other in an upper-lower direction, and are attached to the seat rail bridge by the same fastening member (bolt 59). According to this configuration, attachment portions of the battery cover and the frame cover bracket are reduced, and the large accommodation space is ensured inside the pair of left and right seat rails. In addition, the battery cover and the frame cover bracket can be attached at a time by the fastening member, and a burden of attaching the battery cover and the frame cover bracket can be reduced.

In the vehicle body structure of a straddle-type vehicle according to the present embodiment, the frame cover bracket extends along the seat rail bridge, the frame cover bracket has a bridge attachment portion (bridge attachment hole 54) attached to the seat rail bridge and a pair of cover attachment portions (cover attachment holes 52) to which the pair of left and right frame covers are attached, and the pair of cover attachment portions are positioned on an outer side in a vehicle width direction than the bridge attachment portion. According to this configuration, similarly to the attachment portions of the battery cover and the frame cover bracket, attachment portions of the pair of left and right frame covers are also collectively positioned on the seat rail bridge, and the large accommodation space is ensured inside the pair of left and right seat rails.

In the vehicle body structure of a straddle-type vehicle according to the present embodiment, the frame cover bracket is formed with a seat attachment portion (seat attachment hole 53) to which the seat is attached, the bridge attachment portion is a pair of bridge attachment portions separated from each other in the vehicle width direction, and the seat attachment portion is positioned between the pair of bridge attachment portions. According to this configuration, similarly to the attachment portions of the battery cover and the frame cover bracket, an attachment portion of the seat is also collectively positioned on the seat rail bridge, and the large accommodation space is ensured inside the pair of left and right seat rails.

In the vehicle body structure of a straddle-type vehicle according to the present embodiment, the pair of cover attachment portions, the pair of bridge attachment portions, and the seat attachment portion are aligned on the same straight line in the frame cover bracket. According to this configuration, the attachment portions of the battery cover, the frame cover bracket, the frame cover, and the seat are collectively positioned on the seat rail bridge, and tool lines for an attachment work by using tools are also collectively positioned.

In the vehicle body structure of a straddle-type vehicle according to the present embodiment, the seat has a front seat (21) and a rear seat (22), a cushion (81) is attached to the seat attachment portion, and the cushion is formed with an attachment surface (outer peripheral surface 87) to which a rear end side of the front seat is attached and a support surface (upper surface 89) that supports a front end side of the rear seat from below. According to this configuration, an attachment portion on the rear end side of the front seat and a support portion on the front end side of the rear seat are collectively positioned on the seat rail bridge, and the large accommodation space is ensured inside the pair of left and right seat rails.

In the vehicle body structure of a straddle-type vehicle according to the present embodiment, a self-locking nut (45) is attached to an outer peripheral surface of the seat rail bridge so as to protrude from the outer peripheral surface, the battery cover is formed with a positioning portion (recess 67) for receiving the self-locking nut protruding from the outer peripheral surface of the seat rail bridge, and the battery cover is sandwiched between the self-locking nut and the frame cover bracket. According to this configuration, the battery cover is easily positioned with respect to the seat rail bridge, and the battery cover and the frame cover bracket can be easily attached to the seat rail bridge.

In the vehicle body structure of a straddle-type vehicle according to the present embodiment, the seat rail bridge is formed into a cylindrical shape, a planar portion (44) to which the battery cover is attached is formed on the outer peripheral surface of the seat rail bridge, and the planar portion is formed by recessing the outer peripheral surface of the seat rail bridge so that an upper surface of the battery cover has the same height as upper surfaces of the pair of left and right seat rails or is lower than the upper surfaces of the pair of left and right seat rails. According to this configuration, since the battery cover and the frame cover bracket are lowered and the height of the member below the seat is suppressed, it is easy to ensure a wide flat seat surface of the seat.

Although the present embodiment has been described, the above-described embodiment and modifications may be combined entirely or partially as other embodiment.

The technique of the present invention is not limited to the above-described embodiment, and various changes, substitutions, and modifications may be made without departing from the spirit of the technical concept of the present invention. The present invention may be implemented using other methods as long as the technical concept can be implemented by the methods through advance of the technology or other derivative technology. Accordingly, the claims cover all embodiments that may be included within the scope of the technical concepts.

What is claimed is:

1. A vehicle body structure of a straddle-type vehicle in which an accommodation space of a battery is formed inside a pair of left and right seat rails supporting a seat, the vehicle body structure comprising:
   a seat rail bridge connecting the pair of left and right seat rails;
   a pair of left and right frame covers covering the pair of left and right seat rails from sides;
   a battery cover covering the battery arranged in the accommodation space from above; and
   a frame cover bracket to which the pair of left and right frame covers are attached, wherein the battery cover and the frame cover bracket are attached to the seat rail bridge.

2. The vehicle body structure according to claim 1, wherein the battery cover and the frame cover bracket overlap with each other in an upper-lower direction, and are attached to the seat rail bridge by the same fastening member.

3. The vehicle body structure according to claim 1, wherein the frame cover bracket extends along the seat rail bridge,
   wherein the frame cover bracket has a bridge attachment portion attached to the seat rail bridge, and a pair of cover attachment portions to which the pair of left and right frame covers are attached, and
   wherein the pair of cover attachment portions are positioned on an outer side in a vehicle width direction than the bridge attachment portion.

4. The vehicle body structure according to claim 3, wherein the frame cover bracket is formed with a seat attachment portion to which the seat is attached,
   wherein the bridge attachment portion is a pair of bridge attachment portions separated from each other in the vehicle width direction, and
   wherein the seat attachment portion is positioned between the pair of bridge attachment portions.

5. The vehicle body structure according to claim 4, wherein the pair of cover attachment portions, the pair of bridge attachment portions, and the seat attachment portion are aligned on the same straight line in the frame cover bracket.

6. The vehicle body structure according to claim 4, wherein the seat has a front seat and a rear seat,
   wherein a cushion is attached to the seat attachment portion, and
   wherein the cushion is formed with an attachment surface to which a rear end side of the front seat is attached, and a support surface that supports a front end side of the rear seat from below.

7. The vehicle body structure according to claim 1, wherein a self-locking nut is attached to an outer peripheral surface of the seat rail bridge so as to protrude from the outer peripheral surface,
   wherein the battery cover is formed with a positioning portion for receiving the self-locking nut protruding from the outer peripheral surface of the seat rail bridge, and
   wherein the battery cover is sandwiched between the self-locking nut and the frame cover bracket.

8. The vehicle body structure according to claim 1, wherein the seat rail bridge is formed into a cylindrical shape,
   wherein a planar portion to which the battery cover is attached is formed on an outer peripheral surface of the seat rail bridge, and
   wherein the planar portion is formed by recessing the outer peripheral surface of the seat rail bridge so that an upper surface of the battery cover has the same height as upper surfaces of the pair of left and right seat rails or is lower than the upper surfaces of the pair of left and right seat rails.

* * * * *